United States Patent [19]

Raterman

[11] Patent Number: 5,409,872
[45] Date of Patent: Apr. 25, 1995

[54] FCC PROCESS AND APPARATUS FOR COOLING FCC CATALYST DURING REGENERATION

[75] Inventor: Michael F. Raterman, Doylestown, Pa.

[73] Assignee: Mobil Oil Corporation, Fairfax, Va.

[21] Appl. No.: 159,172

[22] Filed: Nov. 30, 1993

[51] Int. Cl.⁶ .......................... B01J 38/32; B01J 8/26; C10G 47/30; F28D 13/00
[52] U.S. Cl. ................... 502/44; 165/104.16; 208/113; 208/164; 422/144; 422/146; 422/147; 502/41
[58] Field of Search .................. 502/44, 41; 208/113, 208/164

[56] References Cited

U.S. PATENT DOCUMENTS

| | | | |
|---|---|---|---|
| 2,492,948 | 1/1950 | Berger | 502/44 |
| 4,989,669 | 2/1991 | Barnes | 502/44 |
| 5,120,691 | 6/1992 | Pontier | 208/164 |
| 5,128,292 | 7/1992 | Lomas | 502/41 |
| 5,198,194 | 3/1993 | Owen et al. | 208/164 |
| 5,273,107 | 12/1993 | Lomas | 502/44 |

Primary Examiner—Paul E. Konopka
Attorney, Agent, or Firm—Alexander J. McKillop; Malcolm D. Keen; Richard D. Stone

[57] ABSTRACT

A process and apparatus for fluidized catalytic cracking (FCC) with cooling of FCC catalyst during regeneration in a baffled heat exchanger attached to the regenerator. The heat exchanger has a vertical baffle defining an inlet and an outlet side. Lift gas added to the outlet side induces flow from the regenerator, around the baffle and back to the regenerator. A symmetrical design, with reversing flow can equalize wear on heat exchanger tubes and permit selected cooling if the heat exchanger outlet is near the regenerated catalyst outlet.

5 Claims, 4 Drawing Sheets

FCC PROCESS AND APPARATUS FOR COOLING FCC CATALYST DURING REGENERATION

BACKGROUND OF THE INVENTION

1. Field of the Invention

The invention relates to fluidized catalytic cracking and heat exchangers.

2. Description of Related Art

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20–60 seconds, less contact time is needed. Conversion of feed can now be achieved in less time and more selectively in a dilute phase, riser reactor.

Although reactor residence time has continued to decrease, the height of the reactors has not decreased proportionally. The need for a somewhat vertical design, to accommodate the great height of the riser reactor, and the need to have a unit which is compact, efficient, and has a small "footprint" has caused considerable evolution in the design of FCC units, which evolution is reported to a limited extent in the Jan. 8, 1990 Oil & Gas Journal article. One modern, compact FCC design is the Kellogg Ultra Orthoflow converter, Model F, which is shown in FIG. 1 of this patent application, and also shown as FIG. 17 of the Jan. 8, 1990 Oil & Gas Journal article discussed above. The unit uses a regenerator consisting of a bubbling dense bed of catalyst. The regenerator has an external heat exchanger, which allows the unit to process heavy crudes, or those containing large amounts of Conradson Carbon Residue material, without overheating.

Such cooling of the catalyst regenerator is ancient art. In the 40's, many FCC regenerators had external catalyst coolers. With better unit design, and more active catalyst, the units ran "heat balanced" and did not require catalyst coolers. Today FCC units are being pushed to crack heavier and heavier feeds, which contain large amounts of CCR, so once again catalyst coolers are needed to permit heat balanced operation.

Coolers are now usually connected to the bubbling dense bed of catalyst in the regenerator, as in the Kellogg HOC design. These bubbling dense beds regenerate catalyst and store it until recycled to the riser reactor. Not all regenerators use bubbling dense bed as the primary means of removing carbon from spent catalyst.

The "High Efficiency Regenerator" (H.E.R.) design uses a fast fluidized bed for most of the coke combustion, and a dilute phase transport riser for some CO combustion. Regenerated catalyst is collected in a bubbling dense bed for reuse, and for recycle to the coke combustor. Such a design makes more efficient use of the catalyst, in that the coke combustor is all highly active, unlike bubbling dense bed regenerators, which are troubled with stagnant beds (due to poor catalyst flow patterns) and regeneration gas bypassing (due to the formation of large bubbles within the bubbling dense bed). The H.E.R. design uses a turbulent fluidized bed, or a fast fluidized bed, which allows use of less catalyst than is required in a bubbling dense bed regeneration design.

H.E.R. units have, like bubbling bed units, been pushed to deal with the increased carbon burning duties associated with cracking heavy crudes. The operation of these units has been modified to try to maintain heat balanced operation, either by limiting the heat release during regeneration (partial CO combustion mode) or by removing heat via heat exchange.

A partial combustion route to limiting heat release is disclosed in U.S. Pat. No. 4,849,091, which is incorporated herein by reference. Such an approach allows some of the heat release to be shifted to a downstream CO boiler. This takes some of the load from the regenerator, but is not an option at some refineries, or does not take enough heat from the regenerator. Thus many regenerators now run too hot, and some type of heat exchange is needed.

Adding heat exchangers to both bubbling bed and H.E.R. regenerators is reported in many patents.

In U.S. Pat. No. 4,439,533, incorporated by reference, a backmixed heat exchanger is added to the bubbling dense bed of catalyst. There are no slide valves, or elaborate catalyst supply and return lines to the heat exchanger, rather the heat exchanger is closely coupled, and in open fluid communication with the bubbling dense bed. The backmixed heat exchanger looks something like a thimble. Adjusting the amount of gas added to the "thimble" containing the heat exchange tubes allows some control of catalyst circulation and of heat exchange. Cooling fluid, usually water, passes through a tube bundle in the thimble. Cooled catalyst returns to the bubbling dense bed regenerator using the same opening as the entering catalyst.

In U.S. Pat. No. 4,434,245, incorporated by reference, a flow through heat exchanger is disclosed for use with a high efficiency regenerator. There is a hot catalyst inlet in the bubbling dense bed, and a cooled catalyst outlet in the coke combustor or FFB region. This approach requires a significant amount of hardware modifications, slide valves, and a fluidizing air outlet from the upper portion of the heat exchanger to the dilute phase region above the bubbling dense bed.

In U.S. Pat. No. 4,578,366 a flow through heat exchanger is used. Fluidizing gas in the heat exchanger supports combustion in the coke combustor. Catalyst slide valves regulate the flow of hot regenerated catalyst from the dense bed to the heat exchanger.

In U.S. Pat. No. 4,595,567 a flow through heat exchanger is used with heat pipes. Catalyst slide valves regulate the flow of hot regenerated catalyst from the bubbling dense bed into the heat exchanger.

In U.S. Pat. No. 4,430,302 a fast fluidized bed regenerator (without catalyst recycle) has looped heat exchange coils in the fast fluidized bed. Looped coils, formed from 1½ or 2" 304H stainless steel were suspended in multiple banks in the bed. Such an approach will remove a lot of heat, but requires a lot of custom work and is hard to control. To avoid thermal shock refiners like to have heat exchange fluid flowing all the time through the tubes. Heat removal goes on all the time, even during startup when heat input rather heat removal is needed.

I reviewed this extensive art on coolers in regenerators but found nothing that was completely satisfactory. They either cost too much, or removed too little or too much heat, and/or were hard to control.

The flow through, dense phase, down flow exchanger is efficient in terms of heat removal and controllability, but requires separate catalyst inlets and returns, slide valves, and a lot of space. Capital costs are fairly high.

The dense phase back-mixed exchanger avoids some of the plumbing costs. It has only a single connection to the regenerator for solids entry and exit. This reduces the cost to install it, and reduces efficiency to about 60% of a flow through exchanger. The same opening is used for solids entry and exit, and the traffic jam restricts catalyst traffic.

I wanted to avoid use of slide valves to control catalyst flow to the regenerator. These can cost more than $1,000,000 each and are usually used in pairs to permit servicing.

I wanted to avoid coils within the regenerator. Cooling coils should always be full of coolant (to avoid thermal shock and damage to the tubes). Coils full of coolant remove heat even during startup, when the unit requires heating, not cooling. There is concern too that coils may interfere with fluidization within the regenerator.

I wanted a reliable and efficient way to remove heat from a regenerator during normal operation, which could be isolated during startup, while achieving efficient heat removal during normal operation. It was my goal to retain the mechanical simplicity and low cost of a backmixed, dense phase heat exchanger, but improve its efficiency to something approaching that of a flow through heat exchanger.

A baffling improvement provided the key to obtaining the performance of a flow through exchanger in a backmixed exchanger. Using a baffle also allowed frequent or periodic reversal of flow patterns through the regenerator, which can extend the life of the heat exchanger tubes. With proper design, I was also able to selectively cool either the catalyst which would be returned to the reactor, or the bulk of the catalyst in the regenerator.

BRIEF SUMMARY OF THE INVENTION

Accordingly, the present invention provides a process for cooling fluidized catalytic cracking catalyst during catalyst regeneration comprising decoking a coked fluidized catalytic cracking catalyst by contact with an oxygen-containing regeneration gas in a catalyst regeneration vessel operating at coke combustion conditions including a temperature and a superficial vapor velocity sufficient to maintain said catalyst as a fluidized bed in said vessel and at least partially decoke said catalyst to produce a fluidized bed of at least partially decoked catalyst and flue gas; removing a portion of said at least partially regenerated catalyst by allowing same to flow from said fluidized bed in said regenerator vessel to a baffled, vertical heat removal means extrinsic to said vessel and in open fluid communication with said vessel, said vertical, baffled, heat exchange means having: a catalyst inlet in a top portion thereof; a catalyst and fluidizing gas outlet in a top portion thereof; said vertical baffle separating said catalyst inlet and catalyst and fluidizing gas outlet and extending down from said top portion of said exchanger to a lower portion thereof and defining an inlet side beneath said catalyst inlet and an opposing outlet side beneath said catalyst and flue gas outlet; a lift gas distribution means in a lower portion of said exchanger beneath said catalyst and fluidizing gas outlet; a cooling fluid inlet and outlet connective with an indirect heat exchange surface extending into at least one of said inlet side and said outlet side; and cooling said removed catalyst in said indirect heat exchange means and discharging from the catalyst and fluidizing gas outlet of said heat exchange means a cooled catalyst stream up into said fluidized bed in said regenerator vessel.

In another embodiment, the present invention provides a fluidized catalytic cracking (FCC) process wherein a heavy hydrocarbon feed comprising hydrocarbons boiling above about 650° F. is catalytically cracked to lighter products by contact with a circulating FCC catalyst inventory of particles having a size from about 20 to about 100 microns, comprising catalytically cracking said feed in a catalytic cracking reactor at catalytic cracking conditions by contacting feed with a source of regenerated catalyst to produce a cracking reactor effluent mixture comprising cracked products and spent catalyst containing coke and strippable hydrocarbons; discharging and separating said effluent into a cracked product rich vapor phase and a solids rich phase comprising spent catalyst; removing said product rich vapor phase as a product; stripping said solids rich spent catalyst by contact with a stripping vapor to produce stripped catalyst and stripper vapor in a stripping means operating at catalyst stripping conditions; regenerating said stripped catalyst in a catalyst regenerator vessel containing a fluidized bed of catalyst at catalyst regeneration conditions to produce a fluidized bed of at least partially regenerated catalyst; removing a portion of said at least partially regenerated catalyst by allowing catalyst to flow down from said fluidized bed to a baffled, vertical heat removal means extrinsic to said vessel and in open fluid communication with said vessel, said baffled, vertical heat exchange means having a catalyst inlet in a top portion thereof, a catalyst and fluidizing gas outlet in a top portion thereof; said vertical baffle separating said catalyst inlet and catalyst and gas outlet and extending down from said top portion of said exchanger to a lower portion thereof and defining an inlet side beneath said catalyst inlet and an opposing outlet side beneath said catalyst and flue gas outlet, a fluidizing gas distribution means in a lower portion of said exchanger beneath said catalyst and fluidizing gas outlet, a cooling fluid inlet and outlet connective with an indirect heat exchange surface extending up from a lower portion of said heat exchange means into at least one of said inlet side and said outlet side; cooling said removed catalyst in said indirect heat exchange means and discharging from the catalyst and fluidizing gas outlet a cooled catalyst stream into said fluidized bed in said regenerator vessel; and recycling regenerated catalyst from said regeneration means to said catalytic cracking reactor.

In an apparatus embodiment, the present invention provides an apparatus for fluidized catalytic cracking of hydrocarbons to cracked products comprising a regenerator vessel; a riser reactor having an inlet in a base portion for a hydrocarbon feed and for regenerated catalyst withdrawn from said regenerator vessel and an outlet in an upper portion for cracked vapor products and spent catalyst; a reactor vessel connected to said regenerator vessel, receiving and separating said cracked vapor products and spent catalyst discharged from said riser reactor, and having an outlet in an upper portion for vapor and a spent catalyst outlet in a lower portion for spent catalyst; a catalyst stripper having an inlet for spent catalyst discharged from said reactor vessel, an inlet for stripping gas, and a stripped catalyst outlet; a stripped catalyst transfer means having an inlet connected to said stripped catalyst outlet and an outlet connected to said regenerator vessel; said catalyst regenerator vessel having an inlet for spent catalyst connected to said stripped catalyst transfer means, a regeneration gas inlet, an outlet for regenerated catalyst connected to said reactor, at least one flue gas outlet and wherein said regenerator vessel has means for maintaining at least one fluidized bed of at least partially regenerated catalyst therein; a vertical, baffled, heat exchange means in open fluid communication with said fluidized bed of said regenerator vessel having a catalyst inlet in a top portion thereof, a catalyst and fluidizing gas outlet in a top portion thereof, a vertical baffle separating said catalyst inlet and catalyst and fluidizing gas outlet and extending down from said top of said exchanger to a lower portion thereof and defining an inlet side beneath said catalyst inlet and an outlet side beneath said catalyst and fluidizing gas outlet, a fluidizing gas distribution means in a lower portion of said exchanger beneath said catalyst and fluidizing gas outlet, and a cooling fluid inlet and outlet connective with an indirect heat exchange surface extending up from a lower portion of said heat exchange means into at least one of said inlet side and said outlet side.

DESCRIPTION OF PREFERRED EMBODIMENTS

Figure 1:
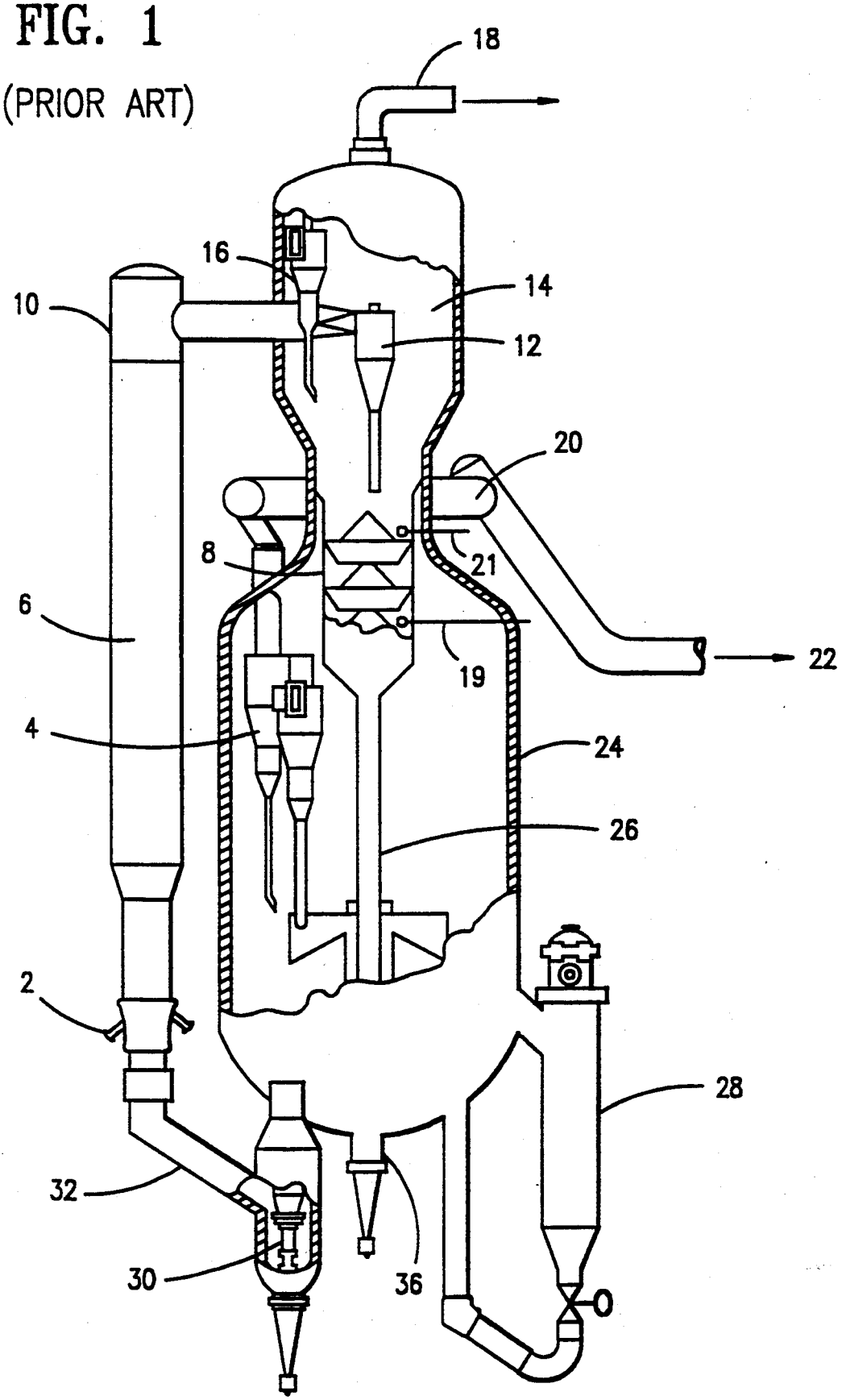
FIG. 1 (prior art) is a schematic view of a conventional, bubbling dense bed regenerator in a fluidized catalytic cracking unit with a flow through heat exchanger.

FIG. 1 (Prior Art) is a simplified schematic view of an FCC unit of the prior art, similar to the Kellogg Ultra Orthoflow converter Model F shown as FIG. 17 of Fluid Catalytic Cracking Report, in the Jan. 8, 1990 edition of Oil & Gas Journal. It corresponds to FIG. 1 of U.S. Pat. No. 5,066,627.

A heavy feed such as a gas oil, vacuum gas oil is added to riser reactor 6 via feed injection nozzles 2. The cracking reaction is completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted by means not shown in the figure. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator, if desired. Regenerated catalyst is withdrawn from the regenerator via regenerated catalyst plug valve assembly 30 and discharged via lateral 32 into the base of the riser reactor 6 to contact and crack fresh feed injected via injectors 2, as previously discussed. Flue gas, and some entrained catalyst, are discharged into a dilute phase region in the upper portion of regenerator 24. Entrained catalyst is separated from flue gas in multiple stages of cyclones 4, and discharged via outlets 8 into plenum 20 for discharge to the flare via line 22.

Figure 2:
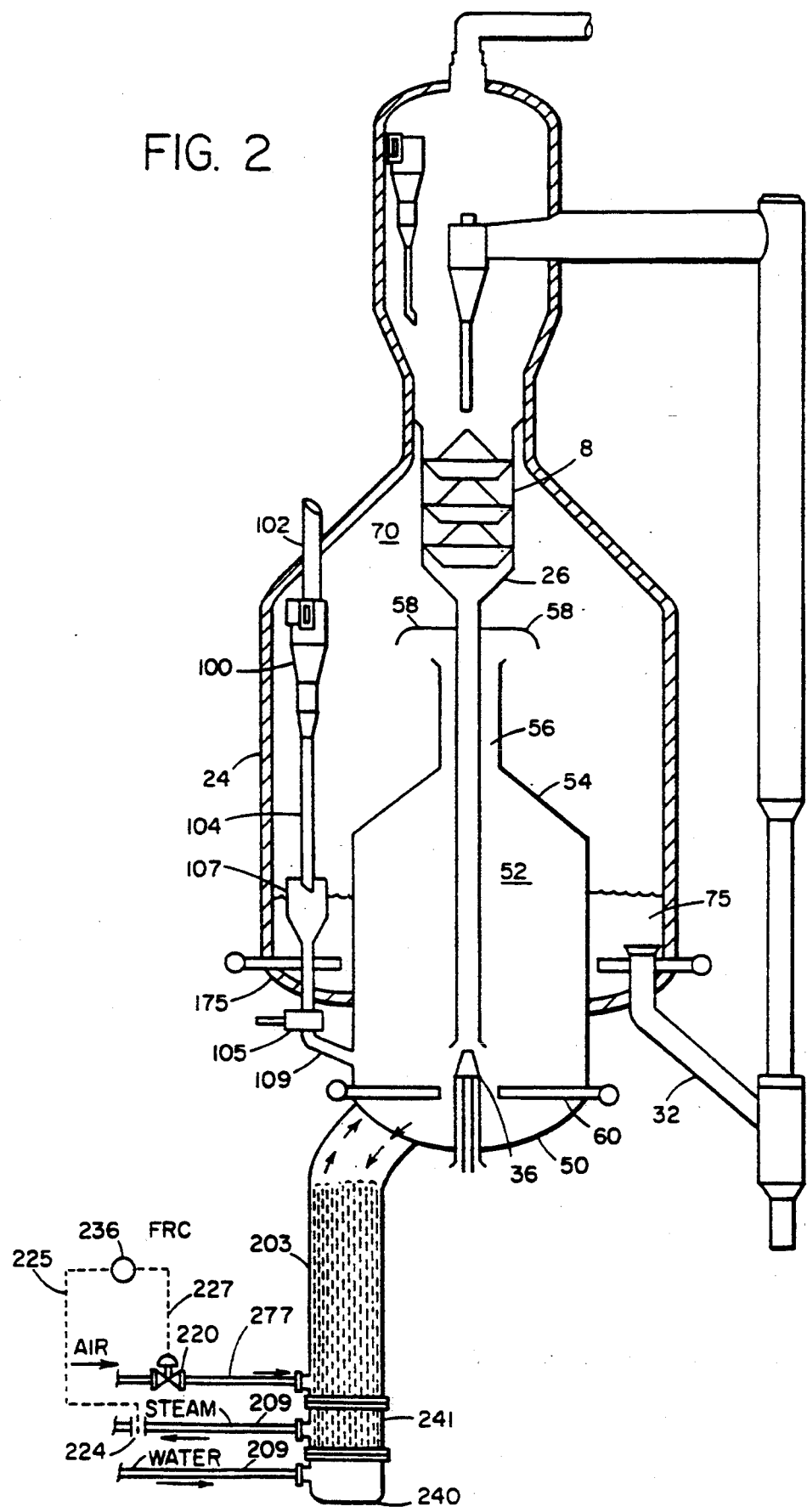
FIG. 2 (prior art) is a schematic view of a backmixed heat exchanger added to a regenerator.
Figure 3:
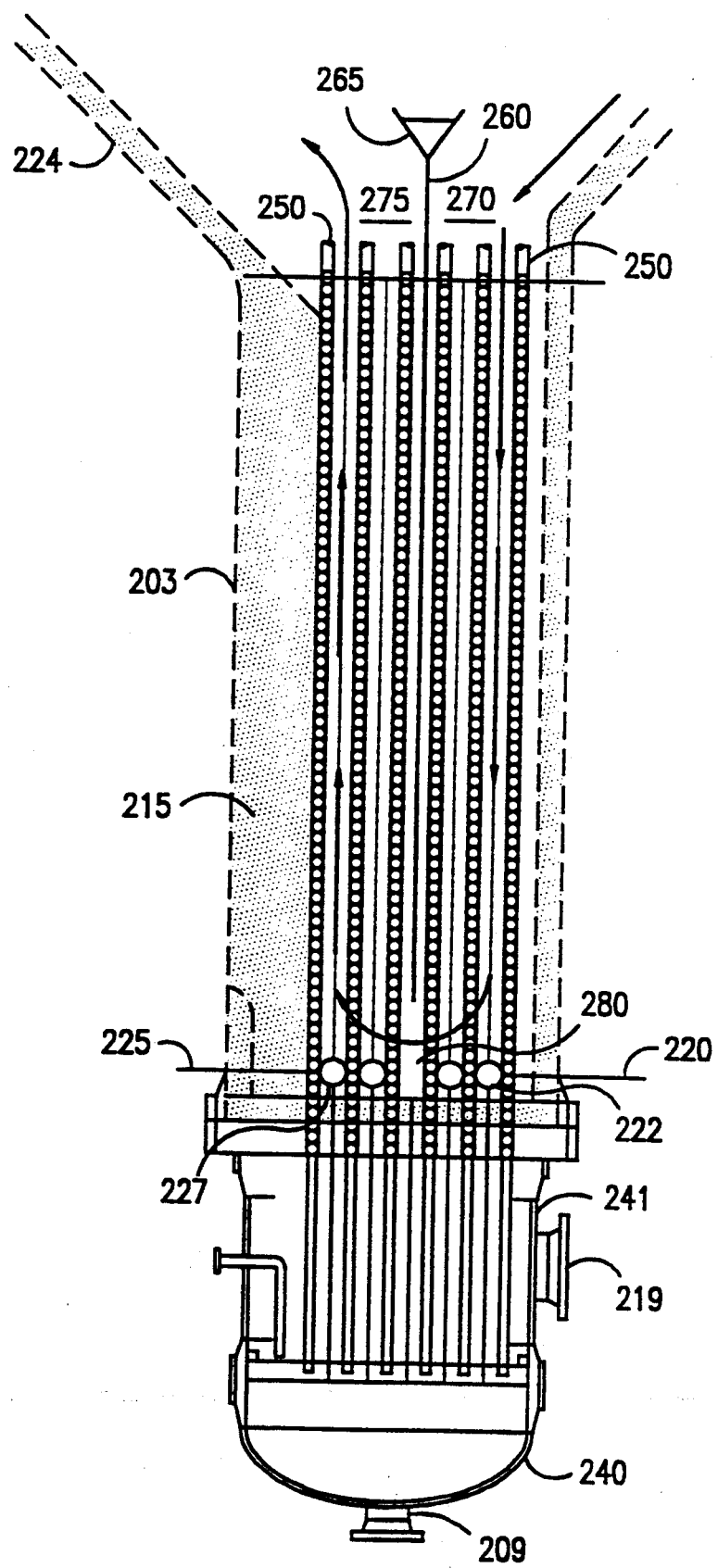
FIG. 3 (invention) is a detailed schematic view of a baffled heat exchanger.

In FIG. 2 (Prior Art—Corresponds to FIG. 3 of U.S. Pat. No. 5,066,627) a backmixed heat exchanger is added to the fast fluidized bed region of a high efficiency regenerator. Regeneration gas, which may be air or another oxygen-containing gas, enters in line 307 and mixes with coke contaminated catalyst entering in conduit 308. These streams are shown as flowing together into mixing conduit 311, although each stream could flow individually into combustion zone 301. The resultant mixture of coke contaminated catalyst and regeneration gas are distributed into the interior of combustion zone 301, at a lower locus thereof, via conduit 311 and distributor 313. Coke contaminated catalyst commonly contains from about 0.1 to about 5 wt. % carbon, as coke. It can contain from about 5 to about 15 wt. % hydrogen, as well as sulfur and other materials. The regeneration gas and entrained catalyst flows upward from the lower part of combustion zone 301 to the upper part thereof in dilute phase. The term "dilute phase", as used herein, shall mean a catalyst/gas mixture of less than 30 lbs/ft$^3$, and "dense phase" shall mean such mixture equal to or more than 30 lbs/ft$^3$. Dilute phase conditions, that is, a catalyst/gas mixture of less than 30 lbs/ft$^3$, and typically 2–10 lbs/ft$^3$, are the most efficient for coke oxidation. As the catalyst/gas mixture ascends within transport riser 310, the heat of combustion of coke and CO is absorbed by the catalyst. The rising catalyst/gas system flows through passageway 310 and impinges on surface 312, which impingement changes the direction of flow of the stream. The impingement of the catalyst/gas stream upon surface 312 causes almost all of the hot regenerated catalyst flowing from the combustion zone to disengage from the flue gas and fall to the bottom portion of disengagement zone 302 which comprises a hot particle collection chamber or fluid particle collection section. The catalyst collection area of the disengagement zone may be a cone-shaped, annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 302 and enter cyclone separation means 315 through inlet 314. Any other effective means for the separation of catalyst from a gas stream can also be used. Catalyst separated from the flue gas is discharged from the cyclones via standpipe 316 and 317 to the bottom of disengagement zone 302. The flue gas exits via conduit 318.

Heat exchanger 303 is vertical, with the catalyst in the shell side and the heat exchange medium, preferably water, passing through the tubes via lines 309 and 309'. The level of the fast fluidized bed of catalyst will always be above the opening into the heat exchanger, so the catalyst may freely backmix. Fluidizing gas, preferably air, is passed into a lower portion of the shell side of heat exchanger 303 via line 377, thereby promoting turbulent backmixing and flow to and from the coke combustion zone. Control valve 320 in line 377 allows more or less air to be added to increase or decrease the amount of heat removed in the heat exchanger.

A typical configuration of tubes in the bayonet-type bundle would be one inch tubes each ascending from inlet manifold 340 in the head up into the shell through a three inch tube sealed at its top, each one inch tube emptying into the three inch tubes in which it is contained just below the sealed end of the three inch tube. A liquid, such as water, would be passed up into the one inch tubes, would empty into the three inch tubes, would absorb heat from the hot catalyst through the wall of the three inch tubes as it passed downward through the annular space of the three inch tubes and would exit the heat exchanger, at least partially vaporized, from outlet manifold 341 in the head. It is important to keep heat exchanger 303 at an elevation, and with an opening large enough, so that catalyst can freely enter the heat exchanger from fast fluidized bed region 301.

Hot regenerated catalyst is removed from the regenerator via line 333. A portion of the hot regenerated catalyst is circulated to the combustion zone via external conduit 342 and control valve 343. Also shown is dipleg or standpipe 345 with bottom flapper valve 346 and upper weir 344. Catalyst can overflow weir 344 and fill dipleg 345. When the force exerted by the head of catalyst filling dipleg 345 on flapper valve 346 exceeds that pressure required to open valve 346, i.e. overcome the force exerted by the spring or counterweight holding the valve closed, catalyst will flow from the dipleg into combustion chamber 301.

FIG. 3 (Invention) shows a detailed view of the baffled heat exchanger and a portion of the regenerator. The heat exchanger may be attached to either a bubbling dense bed regenerator (as in FIG. 1), or to a high efficiency regenerator (as in FIG. 2).

Baffled heat exchanger 203 is attached to catalyst regeneration means 224. Catalyst flows down from the regenerator fluidized bed into inlet region 270 defined by one side of baffle 260 and the walls 224 of the regenerator. A triangular baffle support 265 may be used to support the baffle plate 260 and/or to better define the entrance and exit regions of the device.

Catalyst flows down from region 270 over a plurality of heat exchange tubes 250. These U tubes are of conventional design and available from several vendors, including the M. W. Kellogg Co. They are supported at the base, and can freely expand and contract without thermal stress. Either U tubes, bayonet tubes, baffled plates, etc may be used so long as some type of heat exchange means extends longitudinally in at least one of, and preferably both, the inlet and the outlet side of the heat exchanger. Catalyst flow on the inlet side is generally dense phase, with enough aeration air supplied via line 222 and distributor tubes 220 for minimum fluidization. Catalyst flows under baffle plate 260 to enter the exit side of the heat exchanger, where it flows up around tubes 250 to outlet region 275. Lift air (or steam or other vapor) is supplied via line 225 and tubes 227 disposed at the bottom of the outlet side of the heat exchanger. More air or lift vapor is supplied on the outlet side than the inlet side, reducing the density of the fluidized solids on the outlet side. This reduced pressure on the outlet side relative to the inlet side forces the net flow shown in the figure.

A relatively cold heat exchange fluid, typically boiler feed water, is added via inlet 209 to distributor 240 into the inlets of each heat exchange tube. Steam, or heated vapor, discharged from each tube 250 into collector 241 is removed via outlet 219 for power generation, heating, or other conventional refinery use for heated fluids such as steam.

Figure 4:
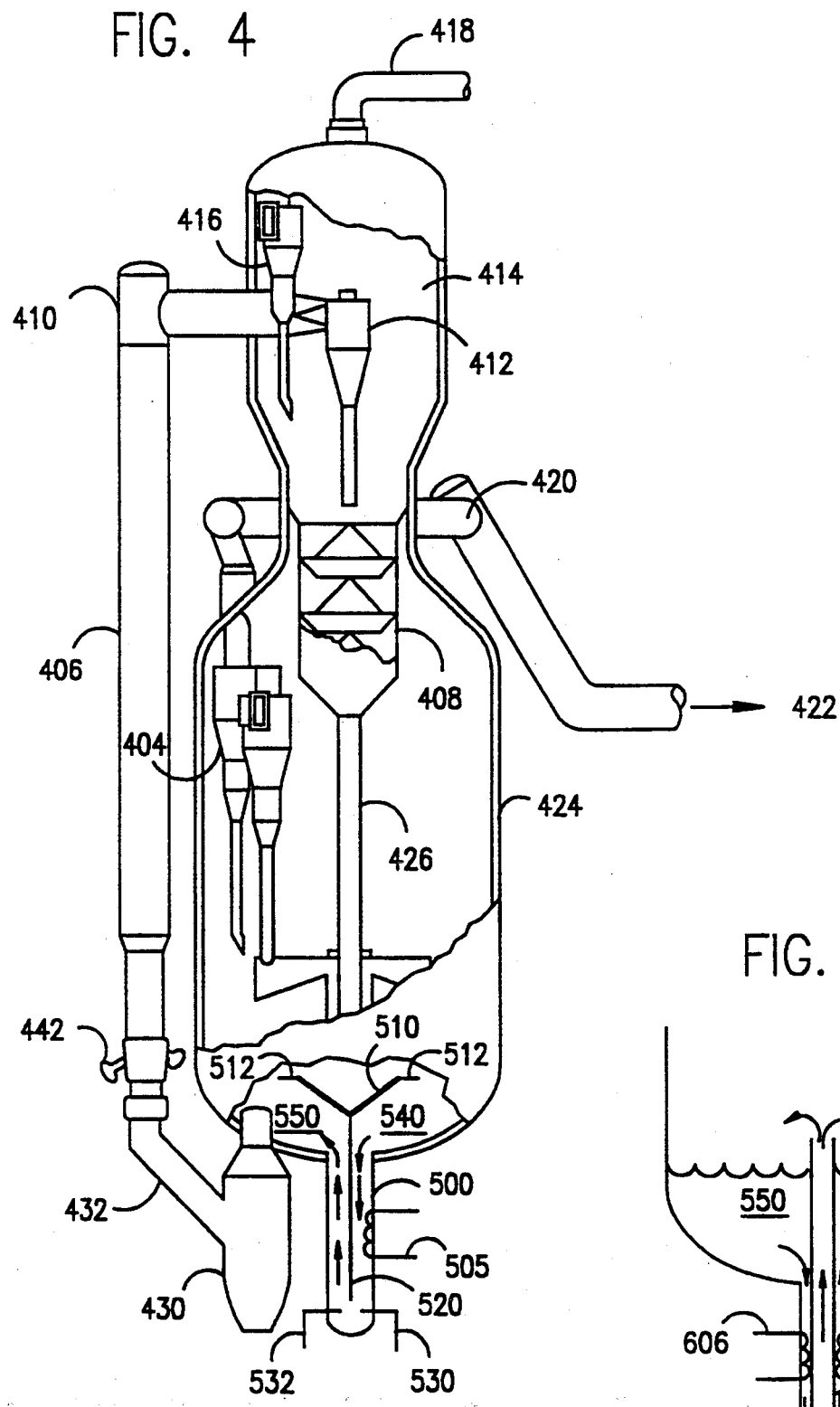
FIG. 4 (invention) is a schematic view of a baffled heat exchanger with reversing flow.

FIG. 4 shows another configuration, with reversing flow permitting an extension of heat exchanger tube life and/or selective cooling of regenerated catalyst returned to the reactor or returned to the regenerator. The reactor, stripper and most parts of the regenerator are identical to the design shown in FIG. 1, though plug valve used to control flow of catalyst from the stripper has been omitted. Like elements have like numerals, renumber by adding 400 to most of the drawing elements, e.g., riser 43 is now riser 432.

The embodiment shown preferentially cools regenerated catalyst returned to the reactor. Heat exchanger 500 consists of a single, illustrative, coil 505 through which boiler feed water or other coolant flows to remove heat. In practice, a dense packing of tubes, similar to that shown in FIG. 3 would be preferred. The tubes, or other heat exchange surface can be on either or both sides of vertical baffle 520.

Catalyst flows into the inlet side, region 540, by passing under horizontal shroud 512 to the V shaped member 510 attached to the upper end of baffle 520. Catalyst flows down through the heat exchanger over tubes 505. Some fluidizing gas may be added via gas inlet and distribution means 530. A larger amount of fluidization and/or lift gas is added via gas inlet and distribution means 532, acting as an air lift to transport cooled catalyst up the outlet side of exchanger 500 to outlet region 550, defined by the walls of the regenerator vessel, V member 510, and horizontal shroud 512. The V member and shrouds may be symmetrical as shown, and such construction is preferred if reversing flow is contemplated. Alternatively, only the left hand side of the V member and horizontal shroud may be used. Cooled catalyst discharged from the outlet side will be near the inlet to the plug valve 430, so that much or all of the cooled catalyst will be withdrawn through plug valve 430 and sent to the base of the riser reactor 430. A bathtub, or more elaborate baffle arrangement may be supplied if desired, but usually will not be necessary, because even bubbling fluidized beds have good mixing characteristics in a vertical direction, so that there will be preferential cooling of catalyst removed near the plug valve.

Figure 5:
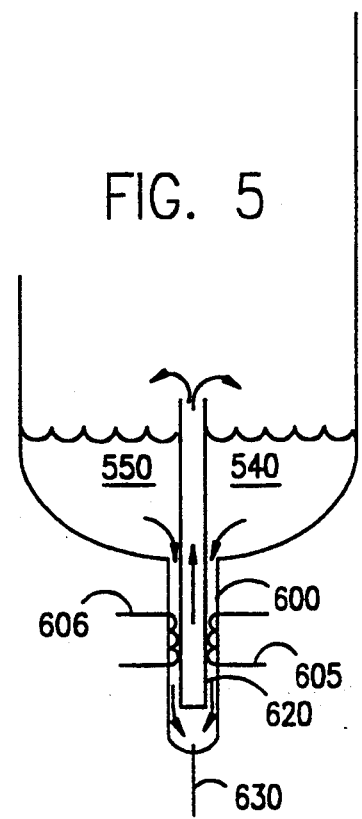
FIG. 5 (invention) is a schematic view of a lift tube heat exchanger.

A lift tube embodiment is shown in FIG. 5, which shows only the details of the exchanger 600 beneath a regenerator. Catalyst flows into the device via inlet region 540 down an annular region intermediate a central lift tube 620 and the walls of exchanger 600. Cooling coils 605 and 606 remove heat from catalyst flowing down the annular passageway. At the base of exchanger 600 a gas sparger means 630 admits air or other lift gas in an amount sufficient to cause flow up the interior of tube 620. Additional fluffing air or gas may be added by means not shown, e.g., a fluffing ring under the heat exchange tubes, or a fluffing ring around the bottom near sparger 630.

Cooler catalyst means more catalyst may be added to the base of the riser to contact feed without exceeding a predetermined riser top temperature. This "winding up" of the unit can significantly increase conversion.

In some units, or during startup, it may be beneficial to have only a modest amount of cooling, and to cool the regenerator rather than the regenerated catalyst charged to the base of the riser reactor. When this is desired, flow of gas to distributor 532 can be reduced or eliminated, and gas flow via distributor 530 increased. This will cause a flow reversal of catalyst through the heat exchanger 500.

The heat exchanger can be identical to the many installed backmixed exchangers save for the presence of horizontal baffle inside, and the offside air addition which reduces density on the outlet side. Although not preferred, a single fluidizing gas inlet may be used on the outlet side if it spills enough air over to the inlet side to maintain fluidization.

Preferably, each side of the heat exchanger has some means to control gas flow, such as valves, pressure controllers or the like. Gas flow can then easily be switched, reducing the amount of gas added to the outlet side to increase the density of the catalyst there while simultaneously increasing gas flow to the old inlet side. In this way the inlet and outlet sides can be reversed, and wear and erosion on the heat exchanged tubes made more equal on both sides of the device, leading to a longer service life.

The absolute and relative quantities of fluidizing gas to each side of the heat exchanger may also be adjusted to control a temperature in or around the regenerator. For this mode, of course, the quantity of steam generated or heat removed to a heat transfer fluid would vary, but the regenerator operation may be made more stable.

DESCRIPTION OF PREFERRED EMBODIMENTS

FCC FEED

Any conventional FCC feed can be used. The process of the present invention is especially useful for processing difficult charge stocks, those with high levels of CCR material, exceeding 3, 3, 5 and even 10 wt % CCR. The feeds may range from the typical, such as petroleum distillates or residual stocks, either virgin or partially refined, to the atypical, such as coal oils and shale oils. Preferred feeds are gas oils, vacuum gas oils, atmospheric resids, and vacuum resids, and mixtures thereof. The feeds usually will have an initial boiling point above about 650° F.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5–40 wt. % of the catalyst, with the rest being matrix. Conventional zeolites include X and Y zeolites, with USY preferred. The zeolites may be stabilized with Rare Earths, e.g., 0.1 to 10 Wt % RE.

The FCC catalyst composition, per se, forms no part of the present invention.

CRACKING REACTOR/STRIPPER/REGENERATOR

The FIG. 1 FCC reactor, stripper and regenerator shell 24, per se, can be conventional, and are available from the M. W. Kellogg Company. The modifications needed to add the baffled heat exchange means to existing regenerator are well within the skill of the art.

HEAT EXCHANGER PROCESS CONDITIONS

The process and apparatus of the present invention uses a heat exchanger which is in open fluid communication with a regenerator vessel. The inlet and outlet sides should be large enough that catalyst flows easily.

High heat transfer rates are possible because the relatively dense phase catalyst flowing down the inlet contains a lot of mass and energy and a reasonably high heat transfer coefficient. The lower density material flowing up and out has a lesser mass and temperature, offset to some extent by a higher heat transfer coefficient from the higher superficial vapor velocity in outlet side.

The superficial vapor velocity on the inlet side must be at least the minimum fluidization velocity. In some instances, especially when the regenerator contains a turbulent or fast fluidized bed of catalyst, there will be sufficient entrained vapor so that the collapsing solids will remain fluidized long enough to reach the bottom of the device and pass under the baffle to receive lift fluid on the outlet side. This is an extreme case, and requires either a high vapor velocity in the regenerator or a relatively short descent to the base of the heat exchanger baffle and lift gas inlet. The upper limit on superficial vapor velocity on the inlet side is set more by fluid dynamics and conditions on the outlet side. The vapor velocity should not be so great as to prevent downflow.

On the outlet side, the lower limit on superficial vapor velocity is that which is sufficient to maintain solids circulation from the inlet to the outlet of the exchanger. This depends on the head available on the inlet side, and to a lesser extent on the conditions in the regenerator. The superficial vapor velocity should be at least 10% higher on the outlet side, preferably 50% higher, and most preferably 100% higher.

The inlet side preferably operates with superficial vapor velocities of 0.1 to 10 fps, preferably 0.5 to 7.5 fps, more preferably 0.75 to 5 fps, and most preferably with 1 to 4 fps.

The outlet side vapor velocity will usually be higher, and usually will be 0.15 to 15 fps, preferably 0.25 to 12 fps, more preferably 0.5 to 10 fps, and most preferably 1 to 8 fps.

It should be noted that the fluidization conditions per se form no part of the present invention. FCC catalyst has been cooled in heat exchangers for over 50 years, and conventional conditions and sizing techniques may be used. What is different is using a baffled exchanger instead of a flow through or backmixed heat exchanger.

One benefit of using high superficial velocities, and in using air as the lift fluid or aeration fluid, is that the spent catalyst can be cooled while it is being regenerated. What damages the catalyst is high temperature steam, and much of this steam is the result of burning hydrocarbons, or high hydrogen coke, sometimes called fast coke. The process and apparatus of the present invention permits some of the heat release to be conducted in intimate association with a heat exchange means which vigorously cools the catalyst.

For smoothest operation, the inlet side of the exchanger should have a cross sectional area equal to at least 30% of the gross cross sectional area of the heat exchanger on the inlet side, and preferably at least 50%.

For a reversing flow unit, as shown in FIG. 3, the size of the inlet should be roughly the same as the side of the outlet, with both inlet and outlet being symmetrical. For a lift tube device, as shown in FIG. 5, the lift tube may be much smaller than the heat exchange side.

FCC REACTOR CONDITIONS

Conventional cracking conditions may be used. Typical riser cracking reaction conditions include catalyst/oil ratios of 0.5:1 to 15:1 and preferably 3:1 to 8:1, and a catalyst contact time of 0.1 to 50 seconds, and preferably 0.5 to 5 seconds, and most preferably about 0.75 to 2 seconds, and riser top temperatures of 900° to about 1050° F.

BENEFITS OF COOLING THE REGENERATOR

Economical and efficient heat transfer is achieved by removing heat from catalyst, without removing catalyst very far from the regenerator, and without building supply and return lines. It is possible to rely solely on natural fluid flow to transfer catalyst from the regenerator through the heat exchange vessel, and back to the regenerator, with flow rate controlled by varying aeration air.

The process and apparatus of the present invention also provides a way to reliably and smoothly remove heat from a regenerator during normal operation, without interfering with the startup of such a unit. If a low coke producing feed is fed to the FCC, the amount of fluidizing gas added to the heat exchanger may be greatly reduced, perhaps to minimum fluidization velocity on both the inlet and outlet side, which will greatly reduce heat transfer. The heat exchange tubes will be covered by a dense, or slightly expanded bed of catalyst, and little heat transfer will occur.

COMPARISON TO CONVENTIONAL HEAT EXCHANGE

The process and apparatus make better use of heat exchange surface than the prior art approaches. The capital expense of a baffled heat exchanger is similar to that of a backmixed heat exchanger and much less than that of a flow through heat exchanger. The efficiency of a baffled heat exchanger is estimated to approach 80 to 90% of that of a conventional dense phase downflow exchanger, while a backmixed exchanger is typically only about 60% as efficient as a dense phase downflow exchanger.

When a reversing flow heat exchanger is used near the regenerated catalyst outlet, refiners now have the ability to control how much heat is removed from FCC catalyst, but to control whether heat removal occurs in the regenerator or on the catalyst charged to the reactor. This facilitates "winding up" the cracking side, by circulating more catalyst, and provides greater control and flexibility in running the regenerator.

My device may be added under conventional regenerators at little cost, or may be added to the side of an existing regenerator, provided there is a sufficient level of catalyst in the regenerator vessel to cover at least the inlet side of my baffled heat exchanger.

In addition to the embodiments shown, other baffle configurations are possible, such as baffles dividing the heat exchanger into 3, 4, 6 or more sections.

I claim:

1. A process for cooling fluidized catalytic cracking catalyst during catalyst regeneration comprising:
   a. decoking a coked fluidized catalytic cracking catalyst by contact with an oxygen-containing regeneration gas in a catalyst regeneration vessel operating at coke combustion conditions including a temperature and a superficial vapor velocity sufficient to maintain said catalyst as a fluidized bed in said vessel and at least partially decoke said catalyst to produce a fluidized bed of at least partially decoked catalyst and flue gas;
   b. removing a portion of said at least partially regenerated catalyst by allowing same to flow from said fluidized bed in said regenerator vessel to a baffled, vertical heat removal means extrinsic to said vessel and in open fluid communication with said vessel, said vertical, baffled, heat exchange means having:
      a catalyst inlet in a top portion thereof;
      a catalyst and fluidizing gas outlet in a top portion thereof;
      said vertical baffle forming a symmetrical inlet and outlet and extending down from said top portion of said exchanger to a lower portion thereof and defining an inlet side beneath said catalyst inlet and an opposing outlet side beneath said catalyst and flue gas outlet;
      a fluidizing gas distribution means in a lower portion of said exchanger beneath said catalyst and fluidizing gas outlet and a fluidizing gas distribution means in a lower portion of said exchanger beneath said catalyst and fluidizing gas inlet;
      a cooling fluid inlet and outlet connective with an indirect heat exchange surface extending into both said inlet side and said outlet side; and
   c. cooling said removed catalyst in said indirect heat exchange means and discharging from the catalyst and fluidizing gas outlet of said heat exchange means a cooled catalyst stream up into said fluidized bed in said regenerator vessel and d. periodically reversing the direction of flow of catalyst through said heat exchange means by reducing fluidizing gas flow to said outlet side, and increasing fluidizing gas flow to said inlet side, in an amount sufficient to reverse the flow of catalyst through said heat exchange means.

2. The process of claim 1 wherein the fluidizing gas is air.

3. The process of claim 1 wherein said indirect heat exchange means comprises vertical bayonet tubes having:

an inner tube with an inlet in a bottom portion and an upper outlet for discharging cooling fluid; and an encompassing outer tube receiving fluid discharged from said upper outlet and conveying fluid down around said inner tube to a heated fluid outlet in a lower portion of said heat exchange means.

4. A fluidized catalytic cracking (FCC) process wherein a heavy hydrocarbon feed comprising hydrocarbons boiling above about 650° F. is catalytically cracked to lighter products by contact with a circulating FCC catalyst inventory of particles having a size from about 20 to about 100 microns, comprising:

a. catalytically cracking said feed in a catalytic cracking reactor at catalytic cracking conditions by contacting feed with a source of regenerated catalyst to produce a cracking reactor effluent mixture comprising cracked products and spent catalyst containing coke and strippable hydrocarbons;

b. discharging and separating said effluent into a cracked product rich vapor phase and a solids rich phase comprising spent catalyst;

c. removing said product rich vapor phase as a product;

d. stripping said solids rich spent catalyst by contact with a stripping vapor to produce stripped catalyst and stripper vapor in a stripping means operating at catalyst stripping conditions;

e. regenerating said stripped catalyst in a catalyst regenerator vessel containing a fluidized bed of catalyst at catalyst regeneration conditions to produce a fluidized bed of at least partially regenerated catalyst;

f. removing a portion of said at least partially regenerated catalyst by allowing catalyst to flow down from said fluidized bed to a baffled, vertical heat removal means extrinsic to said vessel and in open fluid communication with said vessel, said baffled, vertical heat exchange means having a catalyst inlet in a top portion thereof, a catalyst and fluidizing gas outlet in a top portion thereof; said vertical baffle forming a symmetrical inlet and outlet and extending down from said top portion of said exchanger to a lower portion thereof and defining an inlet side beneath said catalyst inlet and an opposing outlet side beneath said catalyst and flue gas outlet, a fluidizing gas distribution means in a lower portion of said exchanger beneath said catalyst and fluidizing gas outlet, and a fluidizing gas distribution means in a lower portion of said exchanger beneath said catalyst and fluidizing gas inlet a cooling fluid inlet and outlet connective with an indirect heat exchange surface extending up from a lower portion of said heat exchange means into both said inlet side and said outlet side;

g. cooling said removed catalyst in said indirect heat exchange means and discharging from the catalyst and fluidizing gas outlet a cooled catalyst stream into said fluidized bed in said regenerator vessel;

h. recycling regenerated catalyst from said regeneration means to said catalytic cracking reactor; and i. periodically reversing the direction of flow of catalyst through said heat exchange means by reducing fluidizing gas flow to said outlet side, and increasing fluidizing gas flow to said inlet side, in an amount sufficient to reverse the flow of catalyst through said heat exchange means.

5. The process of claim 4 wherein regenerated catalyst is withdrawn for recycle to said cracking reactor from a point in said regenerator vessel in fluid communication with said outlet of said baffled, vertical heat removal means.

* * * * *